（12）United States Patent
Uetake et al.

(10) Patent No.: US 10,507,163 B2
(45) Date of Patent: Dec. 17, 2019

(54) METHOD OF MANUFACTURING A PTP SHEET FOR PACKAGING A PHARMACEUTICAL DRUG

(71) Applicant: NIPRO CORPORATION, Osaka (JP)

(72) Inventors: Kazuaki Uetake, Saitama (JP); Naohisa Katayama, Osaka (JP)

(73) Assignee: NIPRO CORPORATION (JP)

( * ) Notice: Subject to any disclaimer, the term of this patent is extended or adjusted under 35 U.S.C. 154(b) by 0 days.

(21) Appl. No.: 16/057,915

(22) Filed: Aug. 8, 2018

(65) Prior Publication Data

US 2018/0344567 A1 Dec. 6, 2018

Related U.S. Application Data

(63) Continuation of application No. 15/316,371, filed as application No. PCT/JP2015/066180 on Jun. 4, 2015, now Pat. No. 10,391,029.

(30) Foreign Application Priority Data

Jun. 5, 2014 (JP) ................................. 2014-116402

(51) Int. Cl.
*B65B 47/00* (2006.01)
*A61J 1/03* (2006.01)
(Continued)

(52) U.S. Cl.
CPC ............ *A61J 1/035* (2013.01); *B65D 75/327* (2013.01); *B29C 51/10* (2013.01); *B29C 51/421* (2013.01);
(Continued)

(58) Field of Classification Search
CPC .......... B65B 47/04; A61J 1/035; B29C 51/10; B29C 51/421; B29C 51/428; B65D 75/36;
(Continued)

(56) References Cited

U.S. PATENT DOCUMENTS 3,759,371 A * 9/1973 Marks ................... B65D 75/327
206/531
4,275,544 A * 6/1981 Hisazumi ................ B65B 31/00
426/127
(Continued)

FOREIGN PATENT DOCUMENTS

EP 0 563 934 10/1993
EP 1 916 201 4/2008
(Continued)

*Primary Examiner* — Luan K Bui
(74) *Attorney, Agent, or Firm* — Jordan and Koda, PLLC

(57) ABSTRACT

A method of manufacturing a PTP sheet for pharmaceutical drug packaging from which a solid pharmaceutical drug is easily taken out and in which a pocket portion is hard to be accidentally damaged. The PTP sheet has a first sheet from which a pocket portion capable of housing a solid pharmaceutical drug protrudes to the side of an upper surface and a second sheet which is stuck to a lower surface of the first sheet and which closes an opening of the pocket portion. The pocket portion has a peripheral wall portion having a peripheral surface continuous with the upper surface and a top portion having a top surface continuous with the peripheral surface of the peripheral wall portion. A wall thickness of the peripheral wall portion is smaller than a wall thickness of the top portion.

6 Claims, 5 Drawing Sheets

(51) Int. Cl.
*B65D 75/32* (2006.01)
*B29C 51/42* (2006.01)
*B65B 47/04* (2006.01)
*B29C 51/10* (2006.01)

(52) U.S. Cl.
CPC .............. *B29C 51/428* (2013.01); *B65B 47/04* (2013.01); *B65D 2575/3254* (2013.01); *B65D 2575/3281* (2013.01)

(58) Field of Classification Search
CPC .......... B65D 75/327; B65D 2575/3254; B65D 2575/3281
USPC .......... 53/440, 127, 453, 559; 206/531, 532, 206/534, 538, 539; 264/291, 292, 320, 264/325; 425/398
See application file for complete search history.

(56) References Cited

U.S. PATENT DOCUMENTS

| | | | |
|---|---|---|---|
| 4,506,495 A * | 3/1985 | Romagnoli | B29C 51/30 53/559 |
| 4,909,722 A * | 3/1990 | Wakayama | B29B 13/023 264/322 |
| 5,783,273 A * | 7/1998 | Yamamoto | B32B 27/08 428/35.9 |
| 5,954,204 A | 9/1999 | Grabowski | |
| 5,992,639 A | 11/1999 | Naito | |
| 6,212,791 B1 | 4/2001 | Thompson | |
| 6,430,984 B2 | 8/2002 | Zeiter | |
| 6,439,390 B1 * | 8/2002 | Kumakura | B65D 75/327 206/469 |
| 6,588,180 B2 | 7/2003 | Heath | |
| 6,699,566 B2 * | 3/2004 | Zeiter | B29C 51/04 428/166 |
| 2002/0100709 A1 | 8/2002 | Shibata | |
| 2003/0051443 A1 * | 3/2003 | Kodai | B29C 51/10 53/453 |
| 2005/0211597 A1 | 9/2005 | Penfold | |
| 2007/0289893 A1 | 12/2007 | Williams, Jr. | |
| 2015/0367566 A1 * | 12/2015 | Schwab | B29C 66/21 53/453 |

FOREIGN PATENT DOCUMENTS

| | | |
|---|---|---|
| JP | 44-12556 | 6/1969 |
| JP | 49-29992 | 8/1974 |
| JP | 53 141787 | 12/1978 |
| JP | 5-39020 | 2/1993 |
| JP | 11-513641 | 11/1999 |
| JP | 2003-095220 | 4/2003 |
| JP | 2007-223625 | 9/2007 |
| JP | 2008/068873 | 3/2008 |
| JP | 2008-100690 | 5/2008 |
| JP | 2012-106771 | 6/2012 |
| WO | WO 97/14630 | 4/1997 |
| WO | WO 2006/023643 | 3/2006 |

* cited by examiner

METHOD OF MANUFACTURING A PTP SHEET FOR PACKAGING A PHARMACEUTICAL DRUG

CROSS REFERENCE TO RELATED APPLICATION

This is a continuation of U.S. patent application Ser. No. 15/316,371 of Nipro Corporation (first named inventor Kazuaki Uetake) filed on Dec. 6, 2016 for "PTP Sheet for Drug Packaging," based on PCT Application No. PCT/JP2015/066180 filed on Jun. 4, 2015.

BACKGROUND OF THE INVENTION

The present invention relates to a PTP sheet for pharmaceutical drug packaging.

PTP (Press Through Package) packaging has been widely used for packaging solid pharmaceutical drugs, such as tablets and capsule agents, in the field of packaging of pharmaceutical products. A PTP sheet for pharmaceutical drug packaging is manufactured by molding pockets each housing a solid pharmaceutical drug in a resin film, loading the solid pharmaceutical drug in each pocket, and then sticking a sheet containing aluminum foil or the like to the resin film to seal the pockets. When the solid pharmaceutical drug loaded in the pocket portion is pressed together with the pocket by a user, the sheet is broken by the solid pharmaceutical drug, so that the solid pharmaceutical drug can be taken out.

CITATION LIST

Patent Literature

Patent Literature 1: Japanese Unexamined Patent Application Publication No. 2012-106771

Patent Literature 2: Japanese Unexamined Patent Application Publication No. 2008-100690

Patent Literature 3: Japanese Unexamined Patent Application Publication No. 2008-68873

Patent Literature 4: Japanese Unexamined Patent Application Publication (Translation of PCT Application) No. 11-513641

SUMMARY OF THE INVENTION

In order to easily take out a solid pharmaceutical drug from a pocket of a PTP sheet for pharmaceutical drug packaging, it is desirable that the pocket is easily pressed and broken by a user. For example, when the pocket is produced in a resin sheet by vacuum molding, the wall thickness of the peripheral wall of the pocket tends to be thick. Therefore, the peripheral wall of the pocket is hard to be deformed, so that the pocket is hard to be pressed and broken. In particular, users having relatively weak hand or finger force, such as elderly persons or children, may be difficult to take out a solid pharmaceutical drug from the PTP sheet for pharmaceutical drug packaging. On the other hand, when a resin film is made thin so that the pocket is easily deformed, the pocket may be damaged by accidently applied external force in transportation or storage.

The present invention has been made in view of the above-described circumstances. It is an object of the present invention to provide a PTP sheet for pharmaceutical drug packaging from which a solid pharmaceutical drug is easily taken out and in which a pocket portion is hard to be accidentally damaged.

Solution to the Problem (1) A PTP sheet for pharmaceutical drug packaging according to the present invention has a first sheet from which a pocket portion capable of housing a solid pharmaceutical drug is protruded to a side of a first surface which is either a front surface or a back surface and a second sheet which is stuck to a second surface opposite to the first surface in the first sheet and which closes an opening of the pocket portion. The pocket portion has a peripheral wall portion having a third surface continuous with the first surface and a top portion having a fourth surface continuous with the third surface of the peripheral wall portion. The wall thickness of the peripheral wall portion is smaller than the wall thickness of the top portion.

The wall thickness of the peripheral wall portion of the pocket portion is smaller than the wall thickness of the top portion. Therefore, due to the fact that a user presses the top portion of the pocket portion toward the second sheet, the peripheral wall portion is deformed, so that the pocket portion is pressed and broken. The pocket portion is pressed and broken and, simultaneously therewith, the solid pharmaceutical drug housed in the pocket portion ruptures the second sheet. On the other hand, since the wall thickness of the top portion of the pocket portion is relatively thick, the top portion is hard to be damaged even when a sharp substance collides with the top portion.

(2) Preferably, a partial region of the first sheet is heated, and then a region containing the partial region is sucked into a decompressed concave portion, whereby the pocket portion is molded.

The partial region is heated in the process where the pocket portion is molded by so-called vacuum molding. Therefore, when the first sheet is sucked into the concave portion, the partial region more easily extends and the thickness more easily decreases as compared with the other region.

(3) Preferably, the partial region is a region corresponding to the peripheral wall portion.

Thus, the thickness of the peripheral wall portion of the pocket portion can be made smaller than the thickness of the top portion by vacuum molding. The top portion of the pocket portion is not heated and is hard to be extended in such a manner that the wall thickness decreases in vacuum molding. Therefore, the transparency of the top portion is improved. Thus, a stamp and the like of the solid pharmaceutical drug housed in the pocket portion can be easily visually recognized through the top portion.

(4) Preferably, the outer shape of the pocket portion is a cylindrical shape.

(5) Preferably, the main component of the first sheet is a thermoplastic resin.

(6) Preferably, the second sheet contains aluminum as the main component.

(7) Preferably, the wall thickness of the peripheral wall portion is 40 to 160 μm and the wall thickness of the top portion is 200 to 400 μm.

Advantageous Effects of the Invention

According to the present invention, the wall thickness of the peripheral wall portion of the pocket portion is smaller than the wall thickness of the top portion, and therefore a solid pharmaceutical drug is easily taken out from the pocket portion and the top portion is hard to be accidentally damaged. Moreover, the transparency of the top portion of the pocket portion is improved, so that the solid pharmaceutical drug housed in the pocket portion can be easily visually recognized through the top portion.

BRIEF DESCRIPTION OF DRAWINGS

FIGS. 1A-1B are perspective views of the appearance of a PIP sheet 10 housing solid pharmaceutical drugs 11, in which FIG. 1A illustrates a state where the PTP sheet 10 is viewed from diagonally above and FIG. 1B illustrates a state where the PTP sheet 10 is viewed from diagonally below.

DESCRIPTION OF THE PREFERRED EMBODIMENT

Figure 1A:
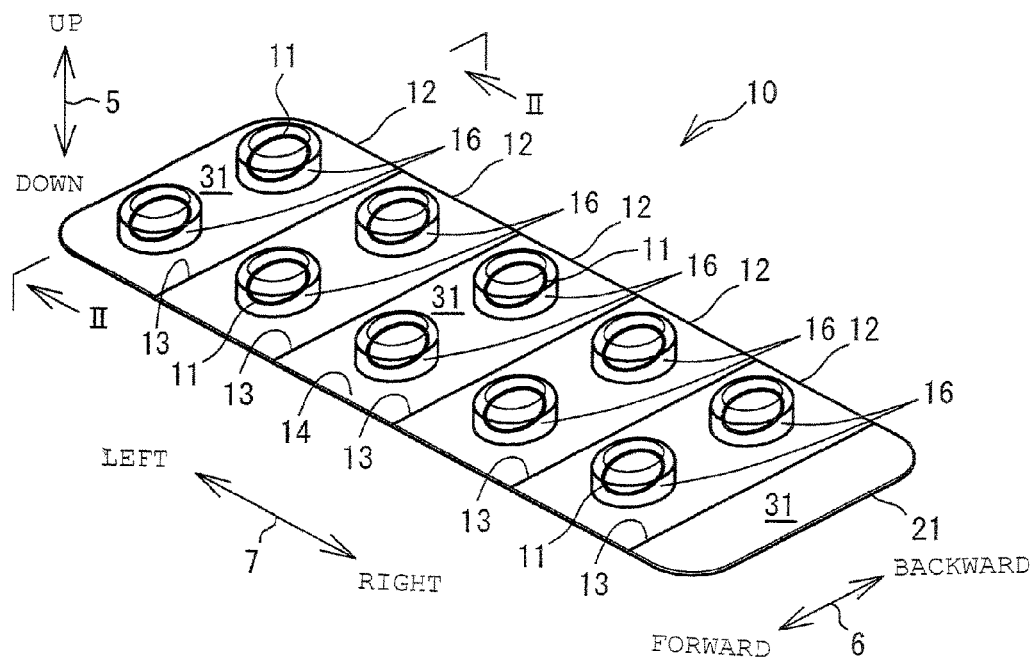

Hereinafter, an embodiment of the present invention is described referring to the drawings as appropriate. The embodiment described below is merely an example of the present invention. It is a matter of course that the embodiment of the present invention can be altered as appropriate in the range where the scope of the invention is not altered. In the following description, an up-and-down direction 5 is defined on the basis of a state where the PTP sheet 10 is disposed with the surface in which the pocket portions 16 are formed upside, the lateral direction in the surface described above is defined as a forward and backward direction 6, and a direction perpendicular to the up-and-down direction 5 and the forward and backward direction 6 is defined as a left and right direction 7.

[Schematic Configuration of PTP Sheet 10]

Figure 1B:
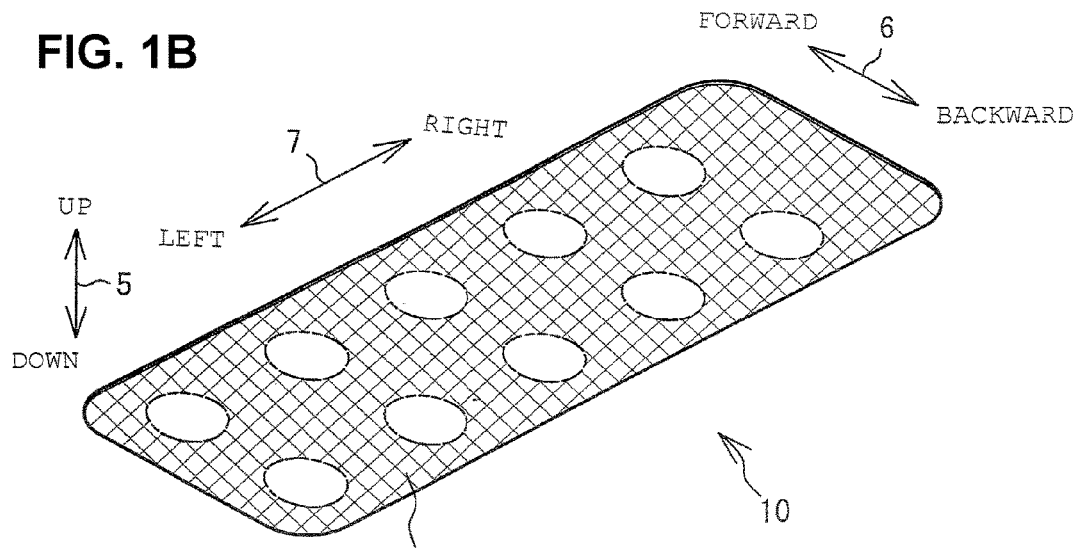

As illustrated in FIGS. 1A and 1B, the PTP sheet 10 (an example of the PTP sheet for pharmaceutical drug packaging) is an approximately rectangular sheet as viewed in plan. The shape of the PTP sheet 10 is not limited to the rectangular shape. For example, the PTP sheet 10 may be a square shape, a rhombus shape, a round shape, or the like as viewed in plan.

Figure 2:
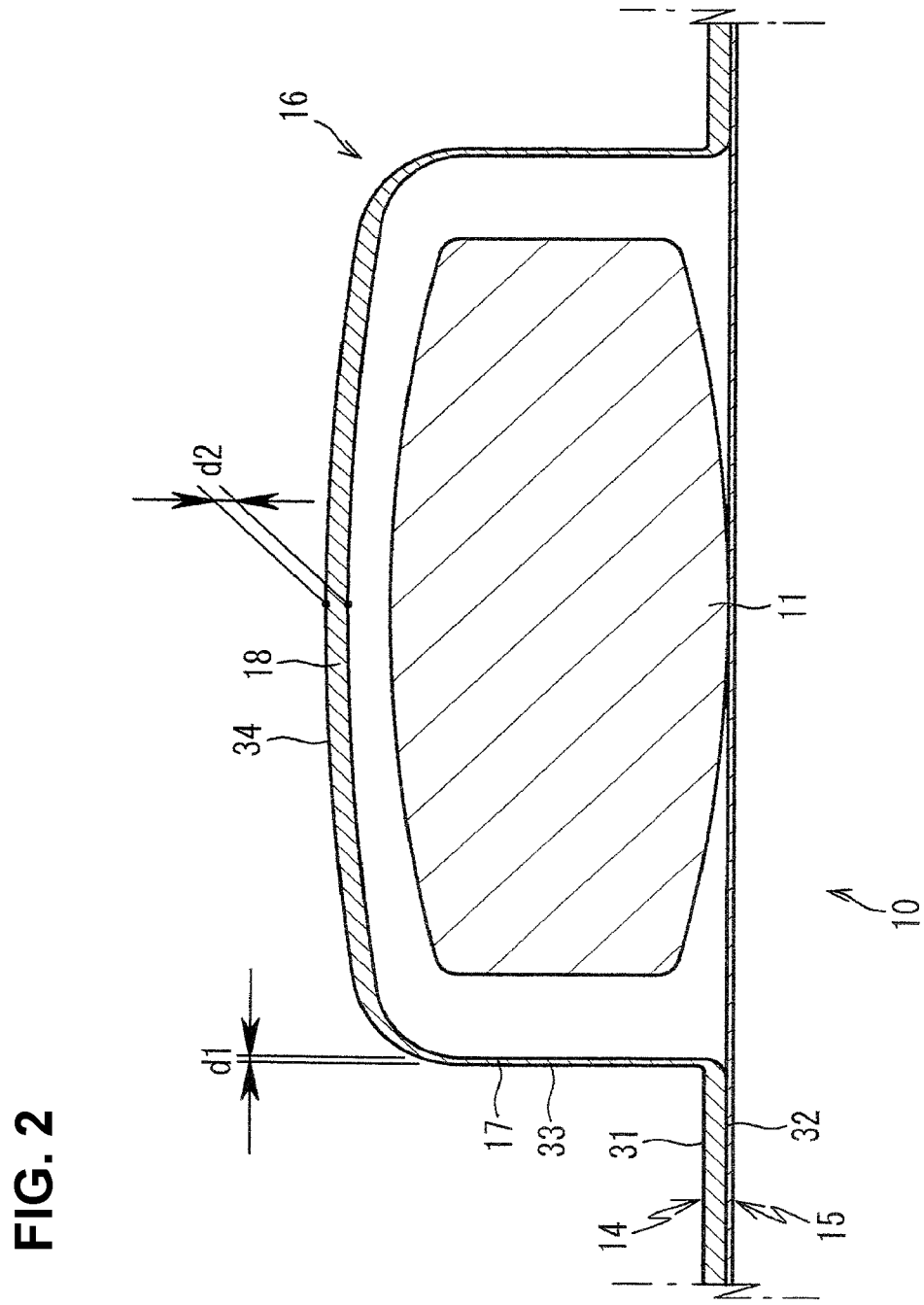
FIG. 2 is an enlarged cross sectional view of a pocket portion 16 of the PTP sheet 10.

As illustrated in FIG. 2, a solid pharmaceutical drug 11, such as a tablet or a capsule agent, is sealed in the pocket portion 16 in the PTP sheet 10. The dimension in the forward and backward direction 6 and the left and right direction 7 of the PTP sheet 10 can be determined as appropriate depending on the number and the size of the solid pharmaceutical drugs 11 sealed in one PTP sheet 10.

The PTP sheet 10 is configured so that five cells 12, which are divisions each sealing two solid pharmaceutical drugs 11, are arranged in the left and right direction 7. In one PTP sheet 10 illustrated in FIGS. 1A and 1B, ten solid pharmaceutical drugs 11 in total are sealed. It is a matter of course that the number of the solid pharmaceutical drugs 11 to be sealed in the PTP sheet 10 is not limited to ten pieces.

On the right side of the cell 12 on the rightmost side, a cell 21 in which the solid pharmaceutical drug 11 is not sealed is provided. The cell 21 is used as a region for holding the PTP sheet 10 by a user, a region for writing down or printing information on the solid pharmaceutical drug 11, or the like. The position where the cell 21 is provided is not limited to the right side of the cell 12 on the rightmost side, may be located on the left side of the cell 12 on the leftmost side or may be located between the two cells 12, or the cell 21 may not be provided in the PTP sheet 10.

The first sheet 14 has slits 13 formed on the boundary between the cells 12 and on the boundary of the cells 12 and 21. The PTP sheet 10 can be divided into one unit of the cells 12 and 21 by being bent along the slit 13 by the hands of a pharmacist or a patient. The dimensions in the forward and backward direction 6 and the left and right direction 7 of the cells 12 can be determined as appropriate depending on the number and the size of the solid pharmaceutical drugs 11 to be sealed in the cells 12. The dimensions in the forward and backward direction 6 and the left and right direction 7 of the cell 21 can be determined as appropriate depending on the amount or the like of information which is to be written down in the cell 21.

The PTP sheet 10 is one in which the first sheet 14 which is a thermoplastic resin and a second sheet 15 which is a laminated sheet in which an aluminum sheet and a resin sheet are laminated on each other are stuck to each other. The solid pharmaceutical drugs 11 are housed in the pocket portions 16 formed in the first sheet 14. The openings of the pocket portions 16 are closed with the second sheet 15. The pocket portion 16 of the first sheet 14 is pressed by the finger of a user, and thus the solid pharmaceutical drug 11 presses and breaks the second sheet 15, whereby the solid pharmaceutical drug 11 packaged in the PTP sheet 10 can be taken out from the pocket portion 16.

Hereinafter, each constituent member of the PTP sheet 10 is described in detail. In the following description, the upper surface and the lower surface of each sheet are defined based on the up-and-down direction 5 described above. An upper surface 31 of the first sheet 14 is equivalent to the first surface and a lower surface 32 of the first sheet 14 (see FIG. 2) is equivalent to the second surface. The up-and-down relationship of the upper surface and the lower surface in the following description is a relative relationship determined for convenience of description and the up-and-down relationship of the upper surface and the lower surface may be reversed.

[First Sheet 14]

As illustrated in FIGS. 1A, 1B, and 2, the first sheet 14 is a sheet obtained by vacuum molding a thermoplastic resin. Examples of the thermoplastic resin include polypropylene (PP), polyvinyl chloride (PVC), polyethylene terephthalate (PET), cyclic polyolefin (COC, COP), or the like, for example. In order to increase the visibility of the solid pharmaceutical drug 11 housed in the pocket portion 16, one having high transparency is preferable. The first sheet 14 may have a laminated structure in which two or more kinds of resin layers are laminated. The first sheet 14 may not necessarily contain only the thermoplastic resin and may be a sheet molded from a resin composition containing a thermoplastic resin as the main component. The thickness of a sheet-shaped portion other than the pocket portions 16 in the first sheet 14 varies depending on the type of the resin to be used and is preferably within the range of 200 μm to 400 μm.

The slits 13 are formed on the boundary between the cells 12. The slits 13 are formed on the side of the upper surface 31 of the first sheet 14 and are approximately V-shaped grooves in the cross sectional shape orthogonal to the upper surface 31. The depth along the up-and-down direction 5 of the slit 13 is slightly longer than half of the thickness of the first sheet 14. The slits 13 may be perforations in which minute holes are periodically formed. Or, the slits 13 may be those in which grooves and perforations are superimposed. In a manufacturing stage of the PTP sheet 10, rollers having a blade on the peripheral edge are relatively moved in a state of being pressed against the upper surface 31 of the first sheet 14, whereby the slits 13 are formed in the first sheet 14.

Two pocket portions 16 are formed in each cell 12 of the first sheet 14. The outer shape of the pocket portion 16 is an approximately cylindrical shape in which the pocket portion 16 protrudes to the side of the upper surface 31 of the first sheet 14. The solid pharmaceutical drug 11 is housed in the internal space formed by the pocket portion 16 in the side of the lower surface 32 of the first sheet 14. The side of the lower surface 32 of the pocket portion 16 is an opening through which the solid pharmaceutical drug 11 is inserted or taken out. The shape, the capacity of the internal space, the size of the opening, and the like of the pocket portion 16 are determined as appropriate corresponding to the outer dimension, capacity, and the like of the solid pharmaceutical drug 11. For example, when the solid pharmaceutical drug 11 is a capsule tablet, the pocket portion 16 may have an oval dome shape as viewed in plan.

As illustrated in FIG. 2, the pocket portion 16 has a peripheral wall portion 17 having a peripheral surface 33 (equivalent to the third surface) continuous with the upper surface 31 and a top portion 18 having a top surface 34 (equivalent to the fourth surface) continuous with the peripheral surface 33. The peripheral surface 33 is a surface forming the side peripheral surface of the cylindrical-shaped pocket portion 16 and is orthogonal to the upper surface 31 or crosses the upper surface 31 at an angle of almost 90°. The top surface 34 is a surface forming the upper end surface of the cylindrical-shaped pocket portion 16 and is almost parallel to the upper surface 31 and has a dome shape having a center portion swollen upward.

A wall thickness d1 of the peripheral wall portion 17 is smaller than a wall thickness d2 of the top portion 18. Specifically, it is preferable that, when the thickness (wall thickness) of the sheet of a portion other than the pocket portions 16 in the first sheet 14 is about 200 μm to 400 μm, the wall thickness of the peripheral wall portion 17 is 40 to 160 μm and the wall thickness of the top portion 18 is 200 to 400 μm.

Figure 4A:
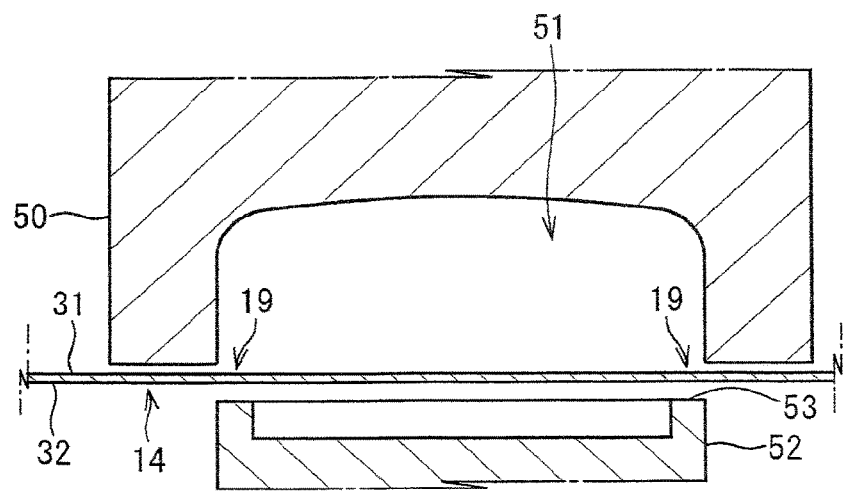
FIG. 4A is a view illustrating a first sheet 14 in a state before the pocket portion 16 is formed by vacuum molding and FIG. 4B is a view illustrating the first sheet 14 in a state where the pocket portion 16 is formed by vacuum molding.

The pocket portion 16 is vacuum molded as follows. As illustrated in FIG. 4A, the first sheet 14 before the pocket portion 16 is molded is a flat sheet having a fixed thickness. On the side of the upper surface 31 of the flat first sheet 14, a die 50 having a concave portion 51 having the shape of the pocket portion 16 is disposed, and then, a heating plug 52 is disposed at a position which is located on the side of the lower surface 32 of the first sheet 14 and faces the concave portion 51. The heating plug 52 has an annular-shaped end surface 53. A portion on the inner side relative to the end surface 53 is cylindrical-shaped space depressed from the end surface 53. The end surface 53 corresponds to the partial region 19 of the first sheet 14 serving as the peripheral wall portion 17 of the pocket portion 16. The partial region 19 and the peripheral wall portion 17 may not necessarily correctly correspond to each other and, for example, the partial region 19 may not form the entire peripheral wall portion 17 but form a part of the peripheral wall portion 17.

As illustrated in FIG. 4A, the partial region 19 of the flat first sheet 14 is heated by the approach of the end surface 53 of the heating plug 52. The heating temperature of the partial region 19 by the heating plug 52 varies depending on a resin to be used as the first sheet 14 and is preferably about 120 to 150° C.

Figure 4B:
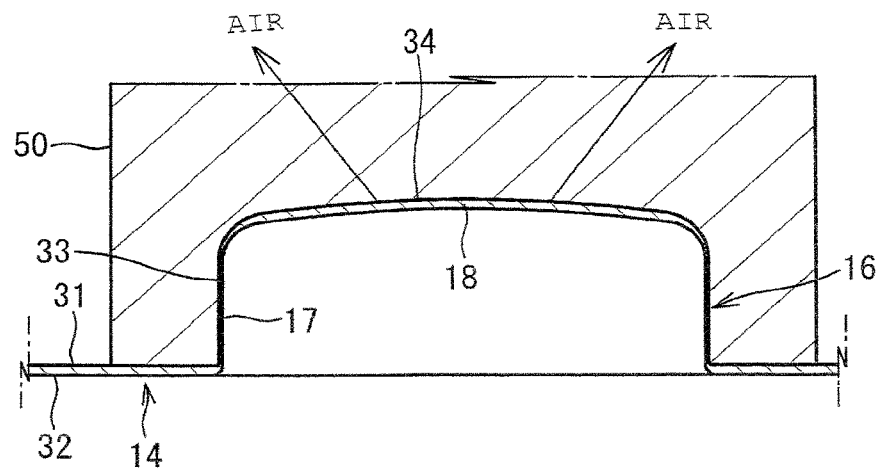

As illustrated in FIG. 4B, the partial region 19 is heated, and then the inside of the concave portion 51 of the die 50 is decompressed. Although not illustrated in FIG. 4A or 4B, the concave portion 51 has an opening of an airflow passage through which gas passes. Due to the fact that the air in the concave portion 51 is sucked out from the opening, the concave portion 51 is decompressed. In connection with the decompression of the concave portion 51, the first sheet 14 which approaches or contacts the concave portion 51 is sucked into the concave portion 51 to be molded following the shape of the concave portion 51. Herein, the partial region 19 heated as compared with the other region of the first sheet 14 extends as compared with the other region, so that the wall thickness decreases. Thus, the pocket portion 16 is molded in which the wall thickness of the peripheral wall portion 17 is smaller than the wall thickness of the top portion 18.

[Second Sheet 15]

The second sheet 15 is a laminated sheet in which an aluminum sheet is laminated in such a manner as to be sandwiched between resin sheets. One of the resin sheets is an acrylic resin and the other one is a vinyl chloride resin. The second sheet 15 may contain only the aluminum sheet or may be a metal sheet other than aluminum. The sheet to be used as a laminated sheet may be resin other than the acrylic resin or the vinyl chloride resin. When thermally fused with the first sheet 14, the vinyl chloride resin is preferable. When characters, signs, and the like are printed, the acrylic resin is preferable. The second sheet 15 may be a resin sheet not containing metal sheets insofar as the airtightness of the pocket portion 16 is securable to some extent.

As illustrated in FIGS. 1A, 1B, and 2, the second sheet 15 is stuck to the lower surface 32 of the first sheet 14 in a state where the solid pharmaceutical drug 11 is housed in the pocket portion 16. The opening of the pocket portion 16 is closed by the second sheet 15, so that the solid pharmaceutical drug 11 is held in the internal space of the pocket portion 16.

Figure 3:
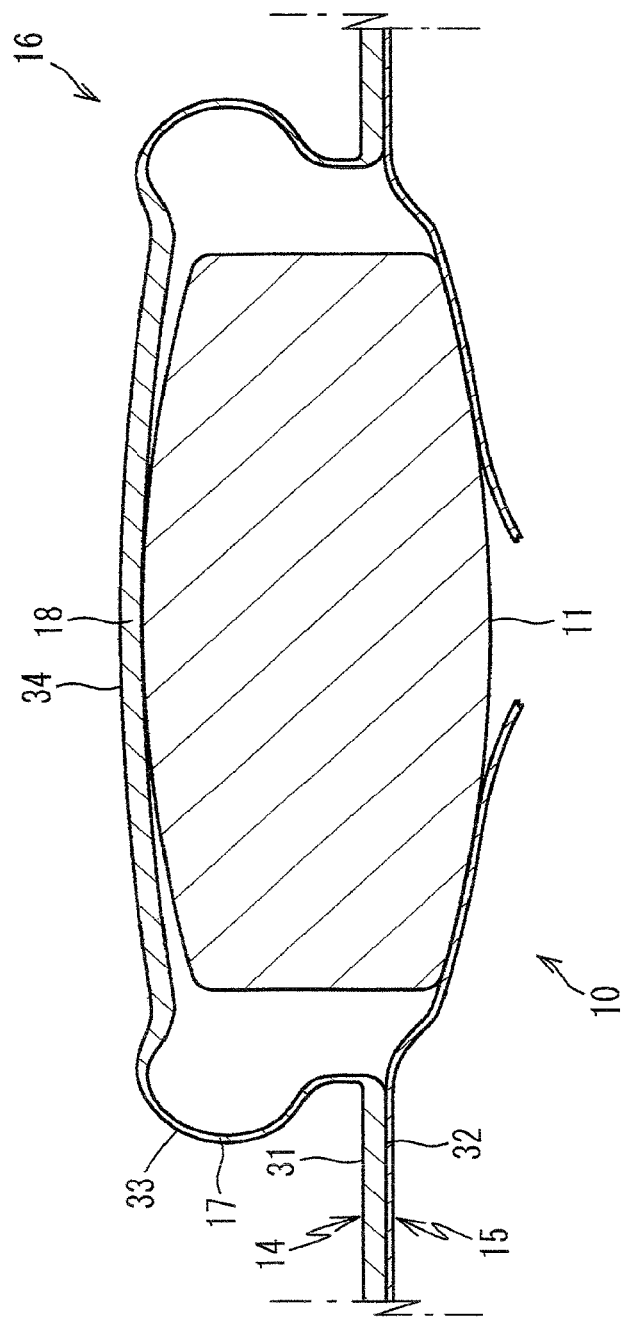
FIG. 3 is an enlarged cross sectional view in a state where the pocket portion 16 is pressed and broken and the second sheet 15 is ruptured.

As illustrated in FIG. 3, when the solid pharmaceutical drug 11 is taken out from the PTP sheet 10, the pocket portion 16 is pressed with the finger of a user. Thus, the peripheral wall portion 17 of the pocket portion 16 is deformed in such a manner as to be bent, so that the pocket portion 16 is pressed and broken and, simultaneously therewith, the solid pharmaceutical drug 11 pressed through the top portion 18 ruptures the second sheet 15. Then, the solid pharmaceutical drug 11 can be taken out from the opening of the pocket portion 16 through the second broken sheet 15.

The thickness of the second sheet 15 is a thickness which allows the breakage of the second sheet 15 by the fixed pressing force from the solid pharmaceutical 11. The thickness of the second sheet 15 is determined as appropriate depending on the raw materials of the second sheet 15, the hardness 11 of the solid pharmaceutical drug 11, e.g., whether the solid pharmaceutical drug 11 is a tablet or a capsule agent, and the like, for example. The thickness of the second sheet 15 is preferably within the range of 20 μm to 25 μm.

The second sheet 15 is thermocompression bonded to the first sheet 14 in which the solid pharmaceutical drugs 11 are housed in the pocket portions 16. The first sheet 14 and the second sheet 15 pass through space between a roller pair, which is mounted in an apparatus for manufacturing the PTP sheet 10 and one roller of which is heated, while being brought into pressure contact with each other by the roller pair in the state where the first sheet 14 and the second sheet 15 are overlapped with each other. Thus, the first sheet 14 and the second sheet 15 are thermocompression bonded to each other. Knurls may be formed in the surface of one roller of the roller pair, then fine irregularities having a mesh pattern formed by the knurls may be formed in the second sheet 15. Means sticking the first sheet 14 and the second sheet 15 to each other is not limited to those described above.

Operational Effects of this Embodiment

According to this embodiment, the wall thickness d1 of the peripheral wall portion 17 of the pocket portion 16 is smaller than the wall thickness d2 of the top portion 18. Therefore, due to the fact that a user presses the top portion 18 of the pocket portion 16 toward the second sheet 15, the peripheral wall portion 17 is deformed and the pocket portion 16 is pressed and broken. The pocket portion 16 is pressed and broken and, simultaneously therewith, the solid pharmaceutical drug 11 housed in the pocket portion 16 ruptures the second sheet 15. On the other hand, since the wall thickness d2 of the top portion 18 of the pocket portion 16 is relatively large, the top portion 18 is hard to be damaged even when a sharp substance collides with the top portion 18.

Moreover, the partial region 19 of the first sheet 14 is heated by the heating plug 52 in the process where the pocket portion 16 is molded by so-called vacuum molding. Therefore, when the first sheet 14 is sucked into the concave portion 51 of the die 50, the partial region 19 more easily extends and the thickness more easily decreases as compared with the other region.

Moreover, since the partial region 19 of the first sheet 14 is a region corresponding to the peripheral wall portion 17, the thickness of the peripheral wall portion 17 of the pocket portion 16 can be made smaller than the thickness of the top portion 18 by vacuum molding.

Figure 5A:
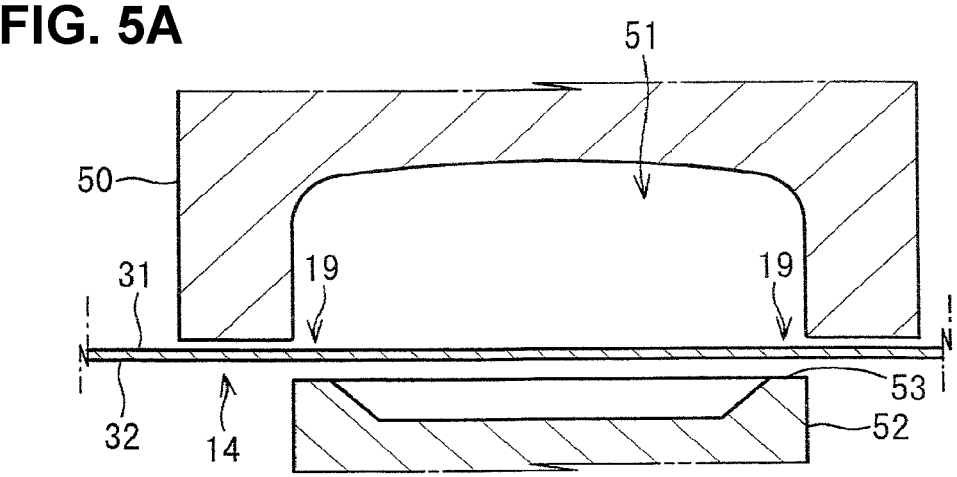
FIGS. 5A, 5B, and 5C are views illustrating modifications of a heating plug 52.
Figure 5B:
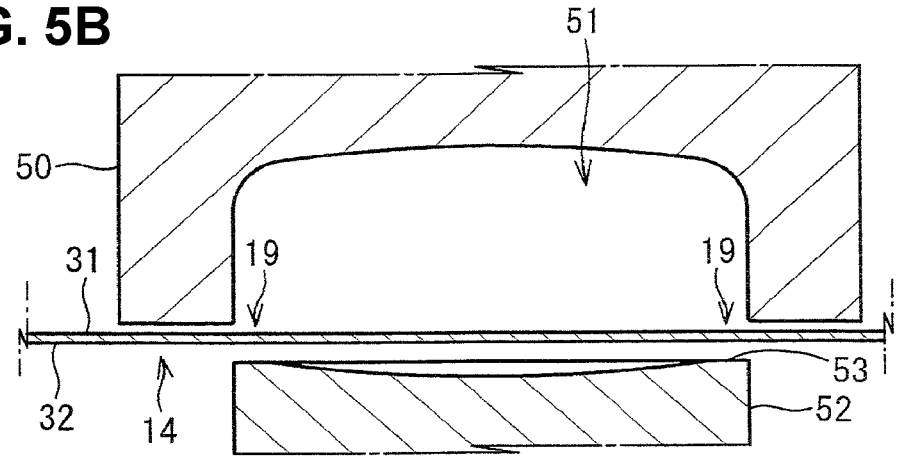
Figure 5C:
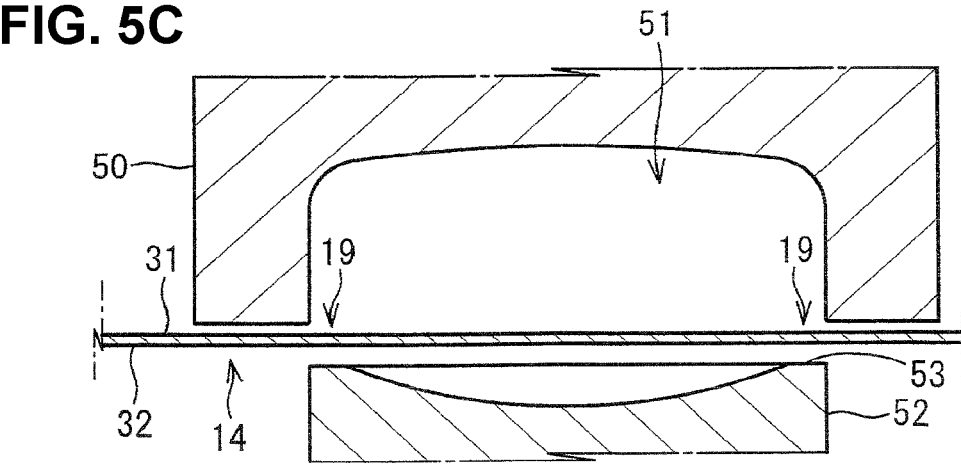

Moreover, the top portion 18 of the pocket portion 16 is not heated by the heating plug 52 and is hard to be extended in such a manner that the wall thickness d2 decreases in vacuum molding, and therefore the transparency of the top portion 18 is improved. Thus, a stamp and the like of the solid pharmaceutical drug 11 housed in the pocket portion 16 can be easily visually recognized through the top portion 18. Modifications The shape of the portion on the inner side relative to the end surface 53 may be changed as appropriate insofar as the heating plug 52 when forming the pocket portions 16 in the first sheet 14 in vacuum molding has the annular-shaped end surface 53. For example, the cross-sectional shape of the depressed portion inside the end surface 53 may have a trapezoid shape, a shallow lens shape, or a deep lens shape as illustrated in FIGS. 5A to 5C, respectively. In the rectangular shape according to the embodiment described above or a trapezoid shape (FIG. 5A) in Comparative Example in which the depth of the cross-sectional shape inside the end surface 53 is relatively deep, heat is hard to be transmitted to the inside of the end surface 53 in the heating plug 52, which results in the fact that the wall thickness of the peripheral wall portion 17 of the pocket portion 16 decreases and the wall thickness of the top portion 18 increases. On the other hand, in the lens shapes (FIGS. 5B and 5C) in which the depth of the cross-sectional shape inside the end surface 53 is relatively shallow, heat is easily transmitted to the inside of the end surface 53 in the heating plug 52, which results in the fact that the wall thickness of the peripheral wall portion 17 of the pocket portion 16 decreases but the wall thickness of a peripheral portion of the top portion 18, i.e., the vicinity of the boundary with the peripheral wall portion 17, also decreases.

Moreover, although the first sheet 14 is obtained by vacuum molding a thermoplastic resin in the embodiment described above but the first sheet 14 may be molded by molding methods other than the vacuum molding. For example, after the partial region 19 of the first sheet 14 is heated by the heating plug 52, the pocket portions 16 may be molded by press molding by male and female dies.

EXAMPLES

Example 1

Using a resin sheet in which polypropylene (PP) and cyclic polyolefin (COC) were laminated as the first sheet 14 and using a laminated sheet in which an aluminum sheet and a resin sheet were laminated as the second sheet 15, the first sheet 14 was heated to about 150° C. using the heating plug 52 (in which the cross-sectional shape is a trapezoid shape: see FIG. 5A) described in the modification described above to manufacture a PTP sheet 10 by vacuum molding.

Examples 2 and 3

PTP sheets 10 were manufactured in the same manner as in Example 1, except using the heating plugs 52 (see FIGS. 5B and 5C) described in the modification described above. More specifically, the PTP sheet 10 in which the cross-sectional shape of the depressed portion inside the end surface 53 of the heating plug 52 had a shallow lens shape (see FIG. 5B) was the PTP sheet 10 of Example 2 and the PTP sheet 10 in which the cross-sectional shape had a deep lens shape (see FIG. 5C) was the PTP sheet 10 of Example 3.

COMPARATIVE EXAMPLE

A PTP sheet 10 was manufactured in the same manner as in Example 1, except using a heating plug not having a portion where the end surface of the heating plug is depressed inside and capable of heating the peripheral wall portion 17 and the top portion 18 of the pocket portion 16 as a whole.

[Measurement of Thickness of Pocket Portion 16]

The wall thickness of the peripheral wall portion 17 and the top portion 18 of the pocket portion 16 of each of the PTP sheets 10 according to Examples 1 to 3 and Comparative Example was measured. For the measurement, a high-precision laser displacement meter (KEYENCE CORP., LT-9000 series) was used. In the peripheral wall portion 17, five places different in positions in the up-and-down direction 5 were measured. The results are shown in Table 1.

TABLE 1

| | | | | | Unit (μm) |
|---|---|---|---|---|---|
| | Top portion | Peripheral wall portion 1 | Peripheral wall portion 2 | Peripheral wall portion 3 | Peripheral wall portion 4 | Peripheral wall portion 5 |
| Ex. 1 | 218 | 46 | 48 | 54 | 60 | 72 |
| Ex. 2 | 224 | 50 | 60 | 68 | 81 | 98 |
| Ex. 3 | 224 | 41 | 47 | 58 | 68 | 89 |
| Comp. Ex. | 67 | 63 | 78 | 85 | 99 | 129 |

[Collapse Test]

Single axial compressive force was applied to the pocket portions 16 of each of the PTP sheets 10 according to Examples 1 to 3 and Comparative Example in the downward direction from the top portion 18 (direction toward the second sheet 15). Then, the measurement was performed under the conditions where the force (N) when the second sheet 15 was ruptured was defined as the upper yield point and the force (N) when the deformation of the top portion 18 reached up to a region (plane region) other than the pocket portion 16 of the first sheet 14 was defined as the maximum point. For the measurement, a tablet press-out tester (Shimadzu Corporation, EZ Test) was used. The results are shown in Table 2.

TABLE 2

|  | Upper yield point | Maximum point |
| --- | --- | --- |
|  |  | Unit (N) |
| Ex. 1 | 18.9 | 28.8 |
| Ex. 2 | 16.5 | 44.7 |
| Ex. 3 | 19.4 | 35.3 |
| Comp. Ex. | 13.7 | 70.5 |

As shown in Table 1, in all Examples 1 to 3, the wall thickness of the peripheral wall portion 17 of the pocket portion 16 was smaller than the wall thickness of the top portion 18. On the other hand, in Comparative Example, most of the wall thickness of the peripheral wall portion 17 of the pocket portion 16 tended to be larger than the wall thickness of the top portion 18 and, in particular, the wall thickness of the peripheral wall portion 17 tended to increase toward the second sheet 15. Moreover, it was confirmed by visual confirmation that the top portion 18 of the pocket portions 16 of each of Examples 1 to 3 had transparency higher than that of Comparative Example.

As shown in Table 2, the force (N) at the upper yield point in Examples 1 to 3 was not different from the force (N) at the upper yield point in Comparative Example but the force (N) at the maximum point in Examples 1 to 3 was clearly smaller than the force (N) at the maximum point in Comparative Example.

[Stability Test]

10 tablets containing losartan potassium and hydrochlorothiazide were enclosed in the PTP sheets 10 according to Example 1 and Comparative Example. Each PTP sheet 10 and each PTP sheet 10 were subjected to aluminum pillow packaging, and then stored at 40° C. and 75% RT (Relative Humidity). Then, the proportion of analogous substances (Total amount and Maximum amount of each substance) contained in the tablets enclosed in each PTP sheet 10 was measured at the start of the storage, 1 month later, 3 months later, and 6 months later. The measurement of the analogous substances was performed using liquid chromatography. The total (total amount) of the peak area of the analogous substances, i.e. each substance other than losartan and hydrochlorothiazide, obtained by liquid chromatography, and the peak area (Maximum amount of each substance) which was the maximum among the peak areas of the analogous substances were calculated as the ratio (%) to the peak area of the losartan in the standard solution. The results are shown in Table 3.

TABLE 3

|  |  | At start of storage | 1 month later | 3 months later | 6 months later |
| --- | --- | --- | --- | --- | --- |
|  |  |  |  |  | (Unit: %) |
| Ex. 1 (without aluminum pillow packaging) | Total amount | 0.06 | 0.09 | 0.09 | 0.43 |
|  | Maximum amount of each substance | 0.02 | 0.03 | 0.03 | 0.23 |
| Comp. EX. (without aluminum pillow packaging) | Total amount | 0.07 | 0.09 | 0.11 | 0.37 |
|  | Maximum amount of each substance | 0.03 | 0.05 | 0.05 | 0.13 |
| Ex. 1 (with aluminum pillow packaging) | Total amount | 0.06 | 0.08 | 0.09 | 0.13 |
|  | Maximum amount of each substance | 0.02 | 0.05 | 0.05 | 0.03 |
| Comp. EX. (with aluminum pillow packaging) | Total amount | 0.07 | 0.08 | 0.07 | 0.12 |
|  | Maximum amount of each substance | 0.03 | 0.04 | 0.03 | 0.03 |

As shown in Table 3, regarding the proportion (Total amount and Maximum amount of each substance) of the analogous substances in each PTP sheet 10 according to Example 1 and Comparative Example and the proportion (Total amount and Maximum amount of each substance) of the analogous substances in each PTP sheet 10 subjected to aluminum pillow packaging, in the comparison between Example 1 and Comparative Example until 6 months passed, a considerable difference in the numerical values was not observed. Thus, it was confirmed that the PTP sheets 10 according to Example 1 and Comparative Example have equivalent airtightness with respect to the storage stability of pharmaceutical drugs.

REFERENCE SIGNS LIST

10 PTP sheet
11 Solid pharmaceutical drug
14 First sheet
15 Second sheet
16 Pocket portion
17 Peripheral wall portion
18 Top portion
19 Partial region
31 Upper Surface (First surface)
32 Lower surface (Second surface)
33 Peripheral surface (Third surface)
34 Top surface (Fourth surface)
51 Concave portion

The invention claimed is:
1. A method of manufacturing a PTP sheet for packaging a pharmaceutical drug, comprising:
  positioning a first flat sheet of fixed thickness between a die and a heating plug, the die having a concavity, the heating plug having an annular-shaped end surface;
  contacting a partial region of the first flat sheet with the annular-shaped end surface, the annular-shaped end surface of the heating plug imparting heat to a corresponding annular shape at the partial region;
  decompressing a concavity of the die by flowing air from the concavity;

in response to the decompressing sucking a pocket portion of the first flat sheet into the concavity and molding the pocket portion to a shape of the concavity, and extending length of the heated partial region during said decompressing and sucking, so that wall thickness of the partial region decreases relative to wall thickness of a remaining portion of the pocket portion and a portion of the first sheet surrounding the pocket portion;

wherein the PTP sheet comprises the first flat sheet and a second sheet, the first flat sheet having a surface for facing the second sheet, the first flat sheet having a first portion, a second portion, and a third portion, the first portion and second portion configured for contacting the second sheet;

wherein the third portion is configured during said sucking and extending steps as the pocket portion having sidewalls and a base portion, the pocket portion configured for holding the pharmaceutical drug; and wherein the partial region forms at least a portion of the sidewalls, the sidewalls having a wall thickness less than the wall thickness of the base portion, the first portion, and the second portion.

2. The method of manufacturing the PTP sheet according to claim 1, wherein an outer shape of the pocket portion is a cylindrical shape.

3. The method of manufacturing the PTP sheet according to claim 1, wherein a main component of the first sheet is a thermoplastic resin.

4. The method of manufacturing the PTP sheet according to claim 1, wherein the second sheet contains aluminum as a main component.

5. The method of manufacturing the PTP sheet according to claim 1, wherein the wall thickness of the sidewalls of the pocket portion is 40 to 160 μm and the wall thickness of the base portion is 200 to 400 μm.

6. The method of manufacturing the PTP sheet according to claim 1, wherein the base portion has a wall thickness equal to the wall thickness of the first portion and second portion of the first sheet.

* * * * *